(12) United States Patent
Gneuss et al.

(10) Patent No.: US 11,504,895 B2
(45) Date of Patent: Nov. 22, 2022

(54) FILTER DEVICE FOR A PLASTIC MELT OR ANOTHER HIGHLY VISCOUS FLUID

(71) Applicant: GNEUSS GMBH, Bad Oeynhausen (DE)

(72) Inventors: Daniel Gneuss, Charlotte, NC (US); Detlef Gneuss, Carabietta (CH); Stephan Gneuss, Bad Oeynhausen (DE)

(73) Assignee: Gneuss GmbH, Bad Oeynhausen (DE)

( * ) Notice: Subject to any disclaimer, the term of this patent is extended or adjusted under 35 U.S.C. 154(b) by 970 days.

(21) Appl. No.: 16/319,592

(22) PCT Filed: Jul. 25, 2017

(86) PCT No.: PCT/DE2017/100621
§ 371 (c)(1),
(2) Date: Jan. 22, 2019

(87) PCT Pub. No.: WO2018/019336
PCT Pub. Date: Feb. 1, 2018

(65) Prior Publication Data
US 2021/0170662 A1    Jun. 10, 2021

(30) Foreign Application Priority Data

Jul. 28, 2016    (DE) .................... 10 2016 113 979.3

(51) Int. Cl.
*B29C 48/691*    (2019.01)
*B29C 48/27*    (2019.01)
(Continued)

(52) U.S. Cl.
CPC ........ *B29C 48/6912* (2019.02); *B29C 48/273* (2019.02); *B29C 48/2545* (2019.02);
(Continued)

(58) Field of Classification Search
CPC .................................................. B29C 48/6914
See application file for complete search history.

(56) References Cited

U.S. PATENT DOCUMENTS

| 5,362,223 | A | * | 11/1994 | Gneuss | ............... | B29C 48/6914 |
| | | | | | | 425/185 |
| 6,325,922 | B1 | | 12/2001 | Schaller et al. | | |
| 2016/0288396 | A1 | * | 10/2016 | Gneuss | .................. | B01D 33/48 |

FOREIGN PATENT DOCUMENTS

| CN | 1772461 A | 5/2006 |
| CN | 201432402 Y | 3/2010 |
| CN | 202336995 U | 7/2012 |

OTHER PUBLICATIONS

International Search Report of Corresponding International Application No. PCT/DE2017/100621, Filed Jul. 25, 2017.

* cited by examiner

*Primary Examiner* — Benjamin M Kurtz
(74) *Attorney, Agent, or Firm* — Muncy, Geissler, Olds & Lowe, P.C.

(57) ABSTRACT

The invention relates to a filter device for a plastic melt or another highly viscous fluid, comprising a housing with an inlet plate and a discharge plate. At least one spacing element and a screen wheel which can be rotated by a drive device are arranged between the inlet plate and the discharge plate. The inlet plate and the discharge plate are clamped against each other with the inclusion of the spacing element via at least three housing clamping elements. An engagement point of the drive device on the screen wheel is arranged outside of the pretensioning surface. When viewed in the rotational direction, an angle α larger than 110° and smaller than 160° is formed on the screen wheel between a first line that extends between the pretensioning surface centroid on which a resulting frictional force $F_R$ acts and the (Continued)

center of the screen wheel and a second line between the center and the engagement point on which an advancing force Fv acts.

19 Claims, 5 Drawing Sheets

(51) Int. Cl.
*B29C 48/25* (2019.01)
*B29K 105/00* (2006.01)
(52) U.S. Cl.
CPC *B29C 48/6914* (2019.02); *B29C 2948/92019* (2019.02); *B29K 2105/0067* (2013.01)

FILTER DEVICE FOR A PLASTIC MELT OR ANOTHER HIGHLY VISCOUS FLUID

The invention relates to a filter device for a plastic melt or another highly viscous fluid having the features of the preamble of claim 1.

When filtering plastic melts, agglomerates or solid particles must be filtered out before the melt can be fed to a further processing plant such as a die-fed extrusion device. To enable uninterrupted production, different types of filter devices are known, which allow the replacement of a filter screen during operation by placing a new, non-contaminated screen in the flow channel and removing the contaminated one from it. A particular difficulty in the filtration of plastic melts is that this must be done at high temperatures and high pressures.

A generic filter device is essentially known from DE 3302343 A1 or EP0 569 866 A1.

DE 3341508 A1 also presents a further generic filter device, in which in addition a drive device is disclosed. This consists of a drive element in the form of a hydraulic cylinder which is attached to a side edge of the housing, a transfer lever and a freewheel unit consisting of a pinion that engages external toothing of the screen wheel and a freewheel that allows a return movement of the transfer lever without moving the screen disc.

DE 3522050 A1 presents a drive via ratchet toothing on the outer circumference of the screen wheel and a feed ram which engages in the toothing to move the screen wheel incrementally.

Known from CN 101602249A is a further generic recess direction in which the screen wheel is also driven via a ratchet device, in which case a draw hook is provided that engages in the toothing by means of the transfer lever and pulls the screen wheel incrementally in the direction of rotation.

The particular advantages of a filter device of this generic type lie in the fact that a large number of individual screens can be placed on the screen wheel, which are successively flowed through and are easily accessible or can be replaced for cleaning purposes on the side facing away from the flow channel. The structure of the filter device is also simple and cost-effective due to the layered structure of the housing.

The main problem, however, is the sealing between the outer housing plates and the screen wheel between them. The housing parts, including the screen wheel, must be braced against each other in such a way that the flow pressure does not cause excessive expansion of the housing and thus no corresponding leakage points are formed. On the other hand, a movability of the screen wheel must be ensured, since it can no longer rotate if it is clamped too tightly. Therefore, there must always be a certain minimum gap width between the front sealing surfaces on the screen wheel and the opposite contact surfaces on the inlet and discharge plates. However, the required gap width also depends on the fluid to be processed and its viscosity, the processing temperature and the flow pressure in the region of the screen section. While one effort thus is leak proofing, a sufficient gap width is also necessary, so that a very slight discharge of the fluid across the sealing webs is possible and a kind of lubricating film is formed by the fluid itself on both face sides of the screen wheel.

A corresponding adjustment of the height of the screen wheel and the height of the spacer elements, also positioned between the inlet and discharge plates, which enclose the screen wheel, make it possible to adjust a certain gap width, which is however in the range of a few micrometers, so that the manufacture of the spacer elements and the associated screen wheel, which together form the so-called internal pairing inserted between the inlet and discharge plates, is very difficult.

It has been shown in practical applications that even with very careful calculation and manufacture of the gap widths, problems arise with regard to the movability of the screen wheel, which can only be remedied by reducing the pretension, which in turn leads to the leak tightness problem.

The problem addressed by the present invention is, therefore, to optimize the pretension in the housing and the gap width required for lubrication and movability of the screen wheel to ensure smooth operation.

According to the invention, this problem is solved by a filter device with the features of claim 1.

The pretensioned surface clamped by the housing clamping elements also is positioned such that the pressurizable surface on the housing is completely enclosed by it, but at the same time all non-pressurized surface portions are kept largely free of pretension, especially in the region of the drive engagement. This reduces the compression of the individual parts of the housing pressed against each other and increases the gap width in relation to the enclosed screen wheel in the regions that are not pretensioned. The pretensioned region applies to all surface portions that are under the influence of pretensioning elements, This surface is first defined by a polygon line that connects the centers of the pretensioning elements. In view of the diameter and the massive design of such pretensioning elements, however, this line is shifted outwards at least by the amount of the radius of the pretensioning elements. Furthermore, it must be taken into account that the pressurized region expands abruptly with the immersion of a screen section when the screen wheel is rotated in the upper region, while at the same time a screen section is turned out of the pressure-affected region at the bottom, so that the surface conditions change continuously in a pulsating manner and are static only when the screen wheel is at a standstill. In terms of the present invention, "complete" therefore means that there are no appreciable pressurizable surface portions that lie so far outside the polygon line mentioned that the housing can expand too much as a result of the internal pressure. If one takes into account that the pretensioned region extends beyond the polygon course, which connects the centers of the pretensioning elements, and that the pressurized surface changes continuously during operation, purely geometric deviations of up to 15%, and in particular of a maximum of 10%, can occur between the pretensioned surface and the pressurizable area, or during operation the then pressurized surface, in order to still meet the criterion "complete" in terms of the present invention.

It is also essential for the invention that the point of action of the feed element lies outside the pretensioned region and that the force exerted via the feed element onto the outer circumference of the screen wheel is directed away from the pretensioning region.

In concrete terms, this means that an angle of more than 90° and less than 160° is enclosed between a first line between the center of gravity of the pretensioned surface and the center of the screen wheel in relation to a second line between the center of the screen wheel and the engagement point of the drive on the screen wheel. This has the following effect: The surface center of gravity of the pretensioned surface can be regarded as the point of action of a restraining force resulting from the surface pressure load in the flow-through region, which due to the friction between the two face sides of the screen wheel and the facing surfaces in the inlet and discharge plate of the housing exists in the pressurized and pretensioned region. The restraining force does indeed act differentially per pressurizable surface unit with an individual lever arm in relation to the rotation axis of the screen wheel but can ideally be assumed as a resulting restraining force acting between the center axis of the screen wheel and the surface center of gravity.

In the context of the present invention, the surface center of gravity is not an exact point in the mathematical-geometrical sense, but rather a small surface region that moves, since the surface and thus the force ratios constantly change due to the continuous and/or incremental rotation of the screen wheel. If all screen sections are constructed in the same way as usual, the surface center of gravity can change, for example, by half the pitch angle on the screen disc.

To overcome the restraining torque resulting from the resulting restraining force in the surface center of gravity, a larger torque is required to overcome static friction forces and thus to set the screen wheel in motion. This required feed torque is caused by the feed force engaging in the screen wheel.

The support point of the transfer element of the drive can also lie on the second radial line mentioned above.

A possible further development of the invention is to have the screen wheel surrounded as far as possible at its circumference by the spacer elements. The necessary pretensions in the housing are thus absorbed very evenly via the spacer elements, which are positioned between the inlet plate and the discharge plate, and distortion of the housing is avoided. In the pretensioned surface clamped by the housing clamping elements, the screen wheel in particular is surrounded by the spacer elements over more than 90% of its circumference. Only in a corner region, which lies on the side facing away from the flow-through side of the housing, the outer circumference of the screen wheel is not covered. The recess there is so large that a teed element of the drive can be arranged, but preferably not much larger than necessary. A further recess in the circumferential covering shall be provided at the lower edge of the housing to allow discharge of fluid which is either required as a lubricating film or other leakage flow.

In the filter device according to the invention, the drive device can engage in a toothing on the outer circumference of the screen wheel and is optionally equipped with a pinion drive or a ratchet drive. A particular advantage of the invention is that, due to the preferred arrangement of the engagement point of the chive in a corner region of the housing—above or below—sufficient installation space is available for both types of drive and therefore one or the other type of drive can be implemented without changing the housing. The arrangement in the corner also makes it possible to enlarge the pretensioned region, and thus the pressurizable region usable for filtration.

In the case of a pinion drive, the direction of the feed force in the region of engagement with the external toothing of the screen wheel is to be regarded as largely tangential. If one extends both vectors—that of the restraining force and that of the feed force—to the rear, thus contrary to their actual orientation, a very small enclosed angle β of theoretically less than 90° results, however, preferably less than 45°, and a theoretical intersection that is far outside the housing surface of the filter device. In any case, the line of action of the feed force runs past the pretensioned region and preferably does not cross it at all or at least not in such a way that the feed vector cancels or reverses the geometric changes to the screen wheel intended by the invention. Contrary to the arrangements in the prior art described above, no force is exerted and directed at the pressurized side of the filter device according to the invention, but only a force pointing outwards away from the pretensioned side of the housing.

This also applies to the selection of a ratchet drive in which a feed element in the form of a ram engages in the toothing. Although the angle between the radius and the vector of the feed force can be unequal 90°, it also applies in this case that the feed force preferably does not cut the pretensioned surface and is directed outwards away from the housing and the pretensioned surface.

Due to the resulting restraining force acting on the surface center of gravity and the feed force acting on the engagement point, which is directed away from the pretensioning region, elongation of the sector of the screen wheel enclosed in between is achieved. Since elongation is always accompanied by transverse contraction due to volume constancy, the thickness of the screen disc in the elongated region is reduced very slightly, whereby the slight pressure reduction is already in the order of magnitude sufficient to achieve a gap width sufficient for movement and lubrication.

Although a compression is caused in the other sector of the screen wheel, which, seen in the direction of rotation, lies between the engagement point of the drive and the pressurized and pretensioned region. However, since the drive is located outside the pretensioned region and preferably in a corner region, a large part of the compression, which is associated with a corresponding increase in the thickness of the screen wheel, takes place outside the pretensioned region. Due to the relatively large inner radius which is typical for screen wheels, the side diametrically opposite to the engagement point of the drive is largely shielded from shear stresses by the hub; this shielded region already affects a large part of the pretensioned surface, i.e. the area below the center of gravity. Finally, the fact that the included angle between the two lever arms, as described above, is between more than 90°, in particular 110°, and 160°, results in an imbalance between elongation and compression. The compressive shear stresses act across a much greater length, so that the associated changes in thickness are comparatively smaller than the elongations.

The described effects would not be possible with an arrangement of the drive on the side diametrically opposite to the surface center of gravity of the pretensioned surface, or at least would be greatly reduced, since the expansions in the upper half and the compressions in the lower half would then balance each other out. Therefore, an angle between these lines of clearly unequal 180° is provided according to the invention.

The fact that, according to the invention, the drive is intended to cause a targeted elongation of the screen wheel means that the larger gap width is created exactly at the moment when it is needed, i.e. when the clocked rotation of the screen wheel occurs and is initiated via the drive. In the subsequent pause in motion, during which the drive mechanism performs a return motion, the above-mentioned elongations can relax, which in turn increases the thickness, reduces the gap width and improves the tightness. Due to the arrangement according to the invention of the pretensioned surface and the engagement point of the drive, a kind of "breathing deformation" occurs within the housing and the screen wheel with a lubricating gap width varying in the micrometer range.

The reduction of the pretensioned surface according to invention allows to keep the plate elements relatively thin on the inlet and discharge side and thus to reduce the material and manufacturing costs, with preferably almost complete lining over the circumference due to the interposed spacer elements.

It is also advantageous if at least two pretensioning elements are arranged such that an imaginary connecting line between them intersects the region of the surface center of gravity area described above. This surface center of gravity can be assumed not only idealized as the point of action of a restraining force counteracting the rotation of the screen wheel, but also as the starting point of a resulting expansion force acting in the direction of the normal of the plates, which is caused by the internal flow pressure. If the housing clamping elements are arranged such that the lines of action of the screw connection run across the center of the expansion force, a narrow strip of the inlet and discharge plates can be roughly approximated and ideally regarded as a bending beam and dimensioned accordingly. A higher bending load of the plates than in this strip-shaped region does not occur. It is also advantageous if additional pairs of housing clamping elements are provided on both sides of the strip-shaped zone described, whose imaginary connecting lines are arranged approximately parallel to the strip zone mentioned or at an acute angle to it.

The invention is described in more detail below with reference to the exemplary embodiments illustrated in the drawings. The Figures show in detail.

Figure 1:
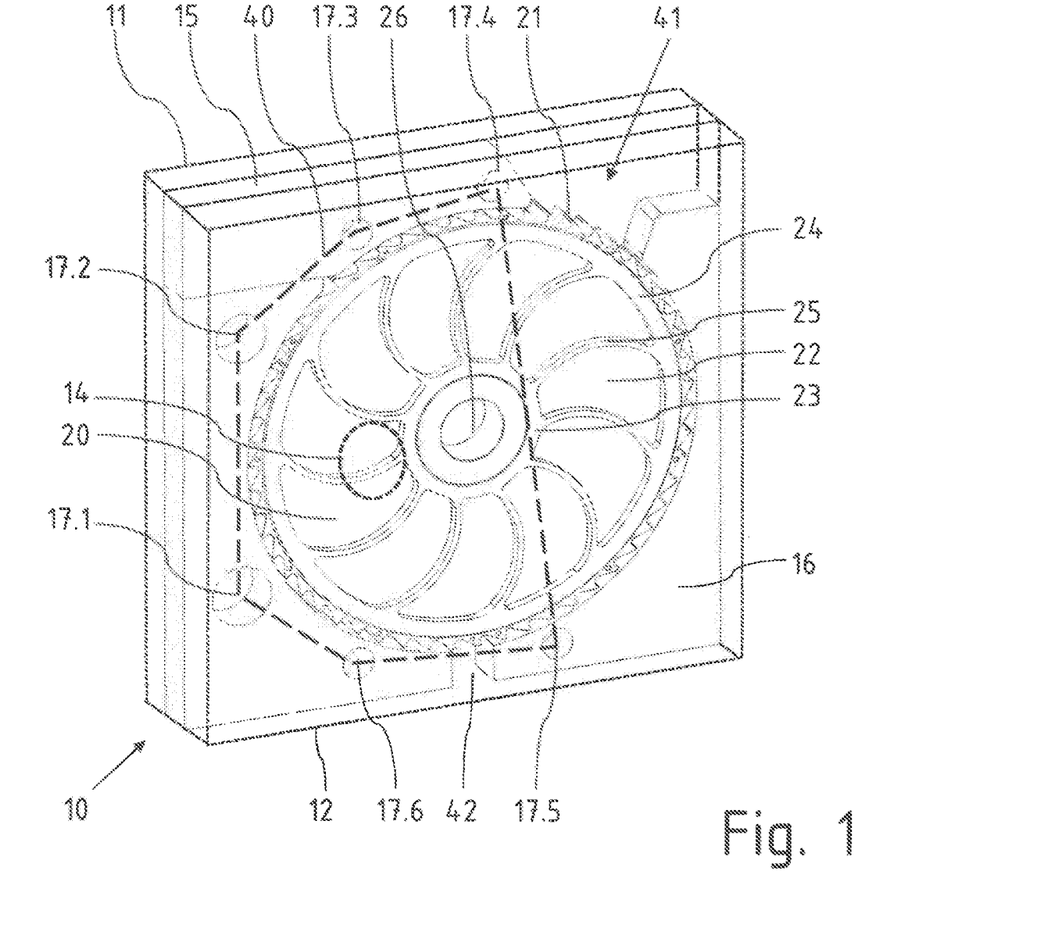
FIG. 1 a perspective view of a housing of a filter device.

FIG. 1 shows a perspective view of a housing 10 of a filter device on the side of a discharge plate 12. FIG. 1 shows only the plane of the so-called inner pairing in full lines, which includes spacer elements 15, 16 and a screen wheel 20. The intermediate plane is enclosed between an inlet plate 11 and a discharge plate 12, both of which are shown as illustrated as imaginary or hidden lines.

All three adjacent elements, i.e. the inlet plate 11, the spacer elements 15, 16 and the discharge plate 12, are connected via a total of six housing clamping elements 17.1 . . . 17.6 and braced against each other with a pretension designed for the operating pressure. The intermediate plane has only two interruptions on the outer circumference of the screen wheel 20: In the upper right corner, where a free space 41 is kept free for the arrangement of a drive or feed element, and on the underside, where a narrow discharge channel 42 is formed between the spacer elements 15, 16 to be able to discharge the fluid accumulating at the lower low point from the housing 10.

The screen wheel 20 is designed in a basically known manner with a large number of screen sections 22, each of which is delimited by an inner annular sealing web 23, an outer annular sealing web 24 and webs 25 extending between them, which run from the inside to the outside. A hub 26 is provided in the middle to accommodate an axle or shaft to support the screen wheel 20 in the plates 11, 12 of the housing 10. Hub 26 can be used as an additional pretensioning element.

The outer circumference of the screen wheel 20 has a ratchet toothing 21 with flanks that drop flat in one direction and jump back in the other.

The housing clamping elements 17.1 to 17.6 cause a compression of the housing elements within a pretensioning area 40, in which the housing elements 11, 12, 15 and parts of the element 16 are strongly pressed against each other, thereby reducing the distance between the inlet and discharge plates 11, 12 and the screen wheel 20 enclosed between them. Beyond the imaginary line between the housing clamping elements 17.4, 17.5, i.e. laterally and below the free space 41 for the drive, there is no strong pretension, so that at this point, where no tightness is required, the friction between the housing plates 11, 12 and the screen wheel 20 is reduced.

The circle designated by 14 indicates the position of the inlet and discharge channels and corresponds to the flow channel with direct flow at the screen wheel 20, which, however, as is basically known, is considerably widened immediately in front of and behind the screen area in order to make better use of the available screen area. Nevertheless, the region of the inlet or discharge channel or the flow channel 14 can be regarded as the position of the surface center of gravity of the pressurizable region. This pressurizable region is completely, or almost completely, within the preload area 40.

An imaginary line between the pretensioning elements 17.3, 17.6 leads directly through the region of the flow channel 14. The connecting line between elements 17.1, 17.2 runs almost parallel to it. A deviation exists only in the position of the last two housing clamping elements 17.4, 17.5, since the lower housing clamping element 17.5 must be shifted further outwards to keep the discharge channel 42 free.

Figure 2A:
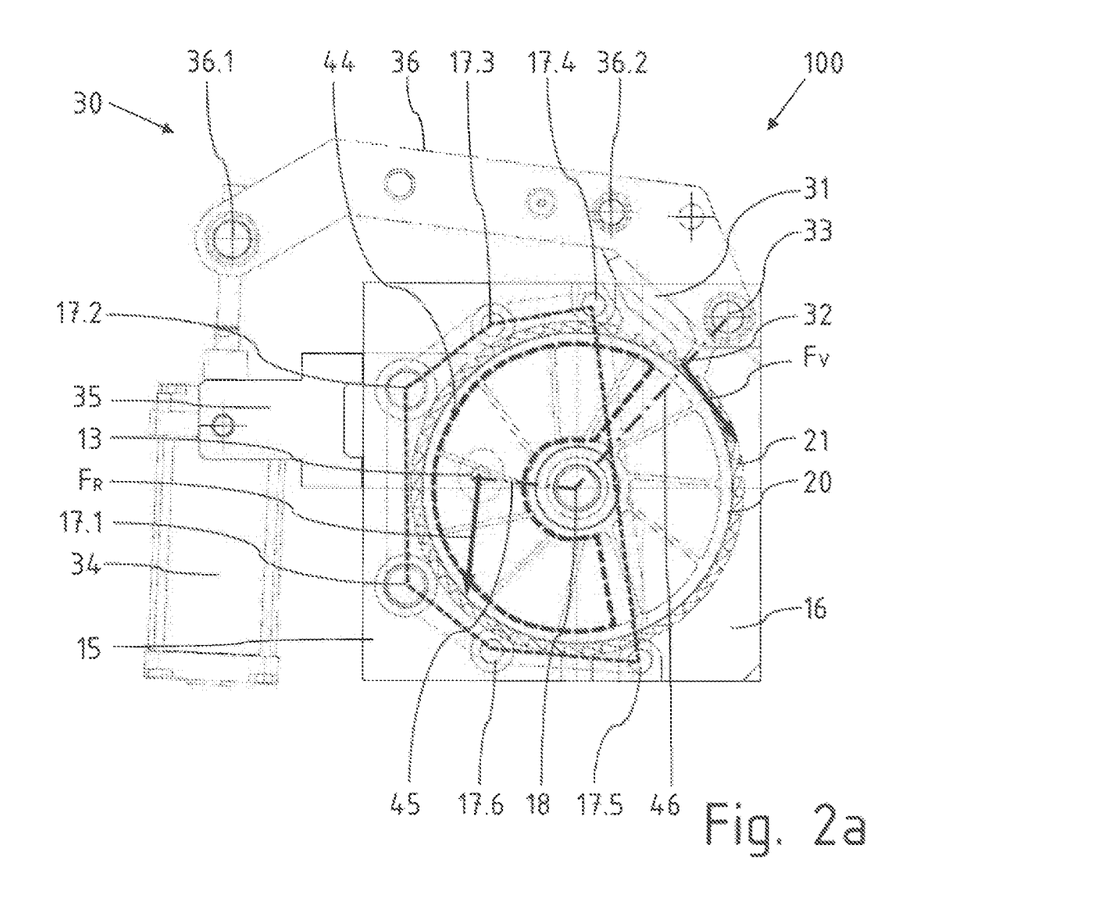
FIG. 2a a filter device in plan view.

FIG. 2a shows a mounted filter device 100 in plan view on the discharge side. A region 44 corresponds to the flow and pressure region, which is extended from the diameter of the inlet channel 13 or the discharge channel. It is symmetrically constructed, with its center of gravity in the region of the flow channel 14, which in turn is arranged slightly above a horizontal center axis in the housing 10. Accordingly, the direction of the restraining force $F_R$ is not entirely vertical but perpendicular to a radial connecting line between the center of the flow channel 14 and the center axis 18.

A further line 46 represents the connecting line between the center 18 and an engagement point 32 of a feed ram 31 into the external toothing 21 of the screen wheel 20. A drive device 30 is formed by a drive element 34 in the form of a hydraulic cylinder that is supported on a bearing element 35, which in this design is mounted directly with the spacer element 15 in the intermediate plane between the plate elements 11, 12. The drive element 34, with its extendable piston, is connected via a first joint 36.1 to a transfer element in the form of a transfer lever 36, which is mounted at a support point 33 in the housing 10, namely on an axle that bridges the free space 41, and at the same time is mounted in both plate elements 11, 12, so that the drive forces act only exactly perpendicularly to the axis of rotation of the screen wheel 20 and asymmetrical distortion of the housing by insertion of the drive is avoided.

A feed element is movably supported on the transfer lever 36 via a further joint 36.2 and is designed in the form of a feed ram 31 which engages with its tip in the toothing 21 at the engagement point 32 and exerts a feed force $F_V$ directed outwards from the housing 10 and, above all, away from the pretensioning region 40.

Figure 2B:
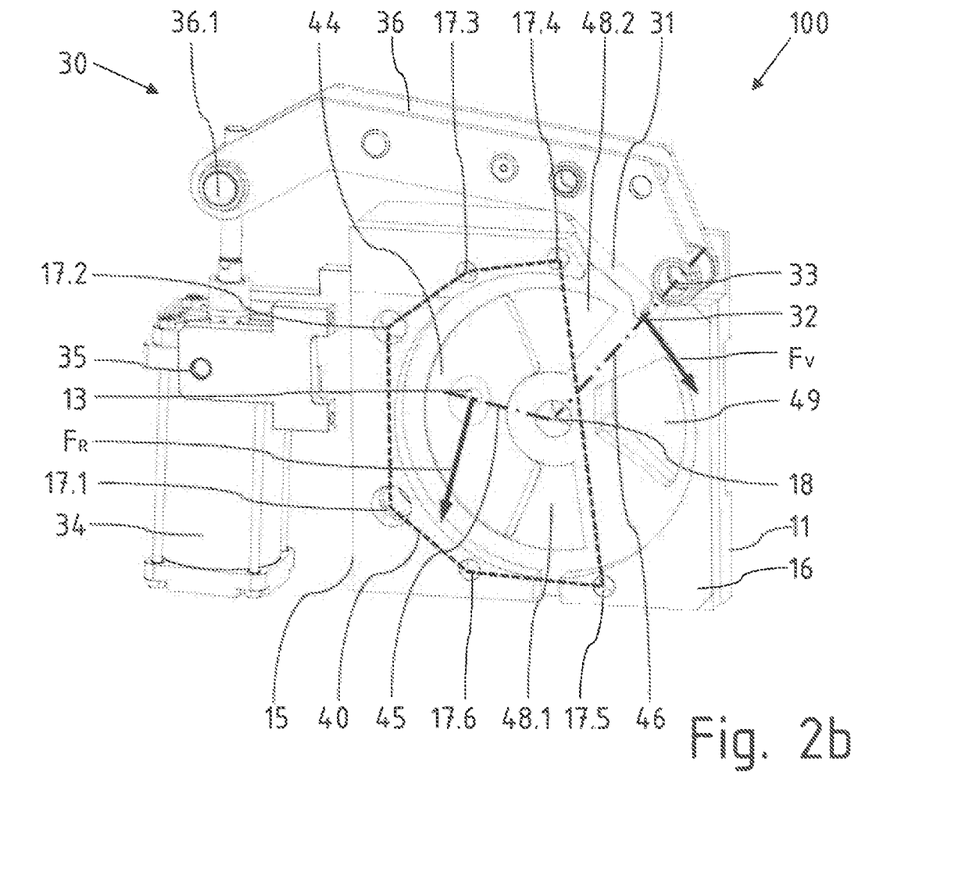
FIG. 2b parts of the filtration device in perspective view.

FIG. 2b shows the filter device 100 in a perspective view on the discharge side, whereby both the screen wheel and the discharge plate have been removed for clarification in this illustration. The inlet plate 11 and the spacer elements 15, 16 as well as the complete drive device 30 of the housing are visible. When looking into the interior of the housing, first the inlet channel 13 in the inlet plate is visible, which expands into an annular segment that encompasses about 120°. The fluid, which exits through the inlet channel 13, can therefore spread unhindered in the pressurizable region 44 and flow through several screen sections of the screen wheel.

This main filter region, in which the inlet channel 13 lies approximately in the center, is supplemented by two further segments 48.1, 48.2 above and below the center axis 18, which in the side view resemble the shape of a coffee filter. These segments 48.1, 48.2 are pressurized by projecting one of the cavities of the screen wheel 20 into the region 44 and pressurizing it from the intersection with the region 44.

The lower segment 48.1 is a preflow area, i.e. the screen section entering there with the clockwise rotation of the screen wheel are pre-flooded with the fluid as soon as a screen section overlaps with region 44, especially if the screen at the relevant screen section has previously been replaced at a screen change position 49.

The pretensioned surface region 44 indicated by the dashed line does not completely enclose the upper segment 48.2, so that a small region of the pressurizable area 44 protrudes. Apart from the fact that the pressure there is reduced in relation to the flow pressure in the region 44, because it is built up only indirectly by a slowed flow within a cavity when the cavity partially overlaps with the region 44, and that the real pretensioned surface extends outwards beyond the polygon course 44, which in the figures represents the pretensioned region, the small protruding region is also advantageous, so that air trapped there can escape if necessary after a screen change.

Figure 3A:
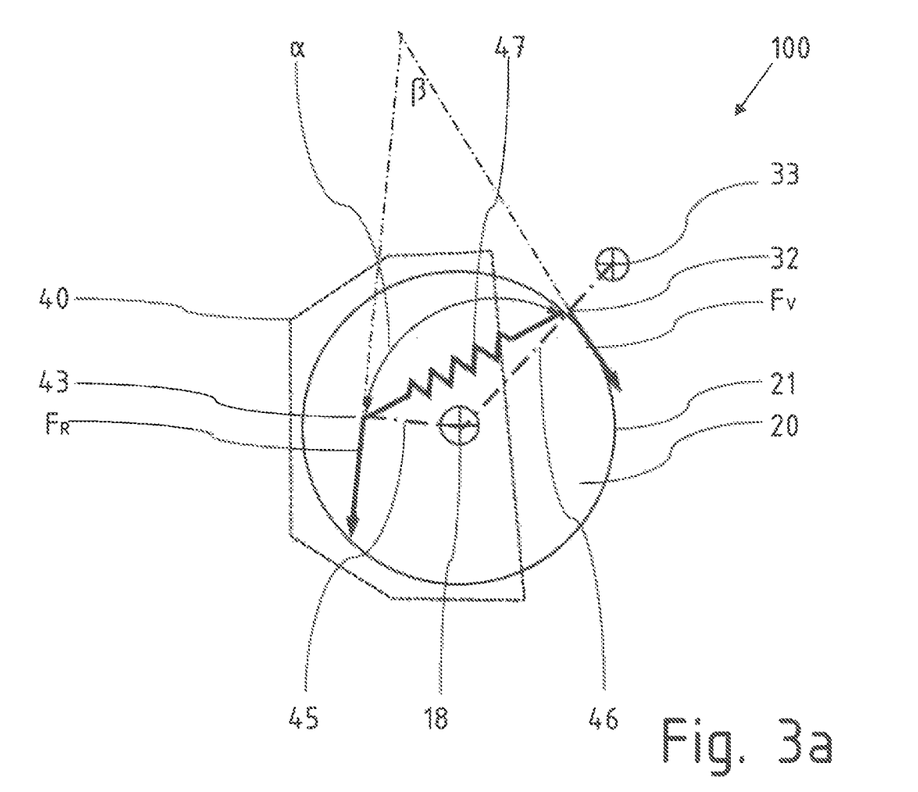
FIGS. 3a, 3b each a schematic illustration of the forces acting on the filter device during operation.

FIG. 3a is a schematic illustration of the force relations and an explanation of the principle of the so-called "breathing deformation". When the drive starts the continued rotation of the screen wheel 20—and only then—does a feed force $F_V$ act via a lever arm corresponding to line 46 in relation to the center 18. Due to the friction, the feed force $F_V$ counteracts a restraining force $F_R$ which varies slightly in location, direction and size depending on where the webs 23, 24, 25 of a screen section are located in the region of the flow channel at a point 43. The levers of both forces $F_R$, $F_V$ include an angle α, which must be significantly larger than 90° and significantly smaller than 180°, otherwise the described elongation effects in the relevant sector of the screen wheel 20 between lines 45 and 46 cannot occur. Preferably the angle α is more than 110° and especially at 135°.

If the force vectors $F_R$, $F_V$ are extended backwards against their orientation, the lines of force intersect at a point outside the housing 10 at an acute angle β of more than 20° and less than 70°. The spring 47 symbolically represents the flexible sector of the screen wheel 20. As already described above, the force vector $F_R$ is to be assumed as always perpendicular to the effective lever length in the form of line 45, since point 43 moves during operation, depending on the momentary flow and pressure conditions, and the lever 45 thus lies on a radius. On the other hand, the force vector $F_V$ acts at a fixed engagement point 32 on the housing, so that the lever arm is firmly defined in the form of lines 46. However, depending on the direction of action of the drive, $F_V$ is not exactly perpendicular to line 46, as also illustrated in FIG. 3a. Thus, the relationship β=180°−α does not apply inevitably.

Also, because of the temporarily variable point 43 as the assumed point of action of a resulting restraining force $F_R$, it must be taken into account that the preferred angular dimension for α=110° . . . 135° is to be regarded as an average value, and that according to the "breathing deformation" an instantaneous angle α(t) is reduced or increased by a few degrees wave-like.

Figure 3B:
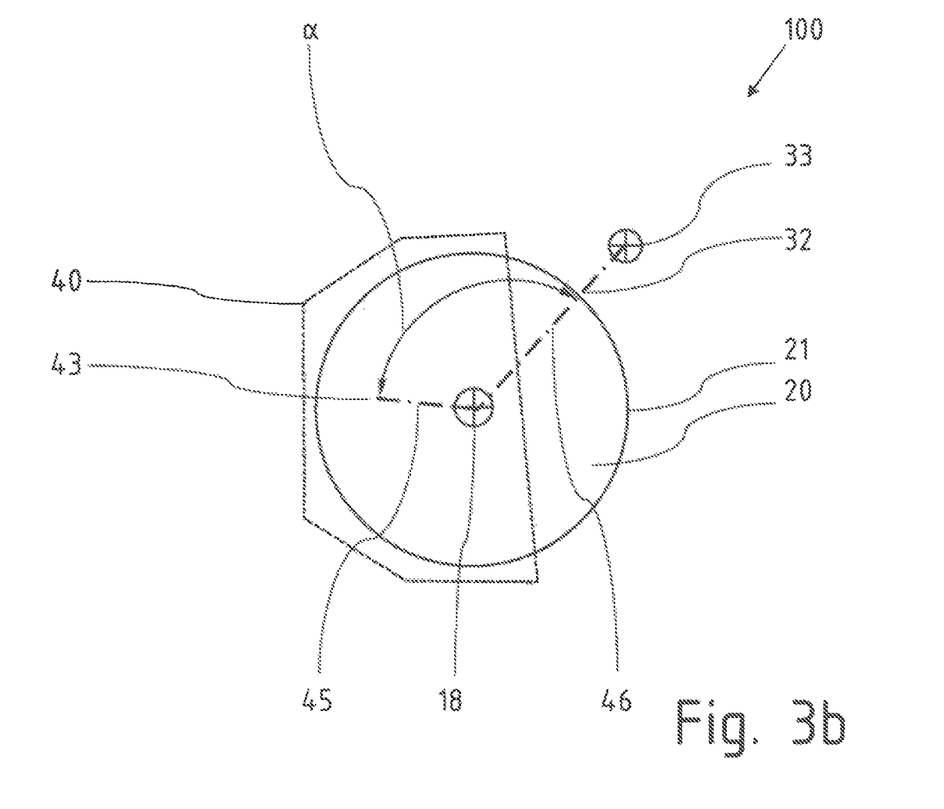

If the drive stops again in order o carry out the retraction movement of the ram 31 and the transfer lever 36 or simply to pause until a new contamination of the screen area is registered, there is no longer any feed force $F_V$ and also no restraining force $F_R$ as a reaction force. This situation is shown in FIG. 3b. During this time interval, the screen wheel 20 can relax in the previously elongated, upper sector and thereby take on its original shape, increasing the width of the screen wheel 20, temporarily reducing the gap width and thus increasing the sealing effect.

The invention claimed is:

1. A filter device for a plastic melt or another highly viscous fluid, comprising:
    a housing having at least:
        an inlet plate with at least one inlet channel,
        a discharge plate with at least one discharge channel;
        spacer elements arranged between the inlet plate and the discharge plate; and
        at least three housing clamping elements, with which the inlet plate and the discharge plate are braced against one another, enclosing the spacer elements;
    a screen wheel rotatably supported in the housing between the inlet plate and the discharge plate, the screen wheel having of screen sections which can each be positioned and flowed through between the inlet channel and the discharge channel, wherein regions of the screen wheel which can be flowed through and to which fluid pressure can be applied lie within a pretensioned area which is spanned by the housing clamping elements; and
    a drive device having a drive element which exerts a feed force Fv on the screen wheel at an engagement point;
    wherein the engagement point of the drive device on the screen wheel is arranged outside the pretensioned area,
    wherein, when viewed in a direction of rotation of the screen wheel, an angle α greater than 90° and less than 160° is included on the screen wheel between a first line which extends between a surface center of gravity of the pretensioned area, at which a resulting frictional force $F_R$ acts, and the center of the screen wheel, and a second line between the center of the screen wheel and the engagement point, at which the feed force Fv acts, and
    wherein the screen wheel is surrounded by the spacer elements across more than 80% of a circumference of the screen wheel.

2. The filter device of claim 1, wherein a support point of the drive device and the engagement point are each arranged in an upper corner region of the housing.

3. The filter device of claim 2, wherein a vector of the feed force Fv exerted by the drive device on the screen wheel is outside the pretensioned area .

4. The filter device of claim 1, wherein a vector of the feed force Fv exerted by the drive device on the screen wheel is outside the pretensioned area .

5. The filter device of claim 1, wherein an outer circumference of the screen wheel is provided with at least one toothing and a feed ram of the drive device engages positively in the toothing at the engagement point.

6. The filter device of claim 5, wherein the toothing on the screen wheel is designed as a symmetrical toothing and the feed ram is a rotatably mounted pinion.

7. The filter device of claim 5, wherein the drive device is designed as a ratchet drive, and wherein the toothing on the screen wheel has flanks which are inclined in the direction of the feed ram.

8. The filter device of claim 5, wherein the drive element is connected to the feed ram via at least one transfer element.

9. The filter device of claim 1, wherein the spacer elements include two spacer elements which are spaced apart from one another on an underside of the filter device and form a discharge channel therebetween.

10. The filter device of claim 8, wherein the transfer element is mounted at a support point of the drive device in an axis extending through the inlet plate and the discharge plate.

11. The filter device of claim 10, wherein the spacer elements include two spacer elements which are spaced apart from one another on an underside of the filter device and form a discharge channel therebetween.

12. The filter device of claim 10, wherein with respect to the regions of the screen wheel that lie within the pretensioned area, more than 90% of a circumference of the screen wheel is surrounded by the spacer elements.

13. The filter device of claim 1, wherein the spacer elements include two spacer elements are provided which are separated from one another in an upper half of the filter device in a region of a support point and the engagement point.

14. The filter device of claim 13, wherein a support point of the drive device and the engagement point are each arranged in an upper corner region of the housing.

15. A filter device for a plastic melt or another highly viscous fluid, comprising:
a housing having at least:
an inlet plate with at least one inlet channel,
a discharge plate with at least one discharge channel;
spacer elements arranged between the inlet plate and the discharge plate; and
at least three housing clamping elements, with which the inlet plate and the discharge plate are braced against one another, enclosing the spacer elements;
a screen wheel rotatably supported in the housing between the inlet plate and the discharge plate, the screen wheel having screen sections which can each be positioned and flowed through between the inlet channel and the discharge channel, wherein regions of the screen wheel which can be flowed through and to which fluid pressure can be applied lie within a pretensioned area which is spanned by the housing clamping elements; and
a drive device having a drive element which exerts a feed force Fv on the screen wheel at an engagement point;
wherein the engagement point of the drive device on the screen wheel is arranged outside the pretensioned area,
wherein, when viewed in a direction of rotation of the screen wheel, an angle α greater than 90° and less than 160° is included on the screen wheel between a first line which extends between a surface center of gravity of the pretensioned area, at which a resulting frictional force FR acts, and the center of the screen wheel, and a second line between the center of the screen wheel and the engagement point, at which the feed force Fv acts, and
wherein with respect to the part regions of the screen wheel situated that lie within the pretensioned area surface, more than 90% of a circumference of the screen wheel is surrounded by the spacer elements.

16. The filter device of claim 15, wherein the spacer elements include two spacer elements are provided which are separated from one another in an upper half of the filter device in a region of a support point and the engagement point.

17. The filter device of claim 15, wherein an angle β of less than 60° is included between respective vectors of the resulting frictional force $F_R$ acting in the pretensioned area and the feed force Fv acting at the engagement point and straight lines leading through the respective vectors intersect outside the housing.

18. A filter device for a plastic melt or another highly viscous fluid, comprising:
a housing having at least:
an inlet plate with at least one inlet channel,
a discharge plate with at least one discharge channel;
spacer elements arranged between the inlet plate and the discharge plate; and
at least three housing clamping elements, with which the inlet plate and the discharge plate are braced against one another, enclosing the spacer elements;
a screen wheel rotatably supported in the housing between the inlet plate and the discharge plate, the screen wheel having screen sections which can each be positioned and flowed through between the inlet channel and the discharge channel, wherein regions of the screen wheel which can be flowed through and to which fluid pressure can be applied lie within a pretensioned area which is spanned by the housing clamping elements; and
a drive device having a drive element which exerts a feed force Fv on the screen wheel at an engagement point;
wherein the engagement point of the drive device on the screen wheel is arranged outside the pretensioned area,
wherein, when viewed in a direction of rotation of the screen wheel, an angle α greater than 90° and less than 160° is included on the screen wheel between a first line which extends between a surface center of gravity of the pretensioned area, at which a resulting frictional force FR acts, and the center of the screen wheel, and a second line between the center of the screen wheel and the engagement point, at which the feed force Fv acts, and
wherein an angle β of less than 60° is included between respective vectors of the resulting frictional force $F_R$ acting in the pretensioned area and the feed force Fv acting at the engagement point and straight lines leading through the respective vectors intersect outside the housing.

19. The filter device of claim 18, wherein the spacer elements include two spacer elements which are spaced apart from one another on an underside of the filter device and form a discharge channel therebetween.

* * * * *